United States Patent [19]

Gates

[11] 4,168,897
[45] Sep. 25, 1979

[54] UNDERWATER CAMERA FOCUS ADAPTER

[76] Inventor: Elwyn G. Gates, 1422 El Prado, Lemon Grove, Calif. 92045

[21] Appl. No.: 961,514

[22] Filed: Nov. 17, 1978

[51] Int. Cl.² .............................................. G03B 17/12
[52] U.S. Cl. ...................................... 354/286; 354/64
[58] Field of Search ......................... 354/286, 64, 195; 350/252, 253, 257

[56] References Cited

U.S. PATENT DOCUMENTS

| 3,001,462 | 9/1961 | D'Oplinter | 354/195 |
|---|---|---|---|
| 3,162,106 | 12/1964 | D'Oplinter | 354/64 |
| 3,498,695 | 3/1970 | Brouwer | 350/253 X |
| 3,682,069 | 8/1972 | Lecoeur | 354/286 X |
| 3,906,534 | 9/1975 | Shirasaki | 350/257 X |

OTHER PUBLICATIONS

Eastman Kodak Research Disclosure: "Focus Compensated Lens", p. 86, 6-1973.

Primary Examiner—L. T. Hix
Attorney, Agent, or Firm—Brown & Martin

[57] ABSTRACT

An adapter for an underwater camera which provides an extension to move the lens outward and increase the lens to film plane distance, so that the camera can focus on a close object. An alignment frame is attached to the adapter to aid in positioning the camera relative to the object. Pressure differential between the inside of the camera and the surrounding water, which normally distorts the camera body and throws the lens out of precise focus, is accommodated by a floating sealing ring which seals the lens barrel to the camera body. Within the sealing ring the lens barrel is locked firmly to the adapter and the adapter is locked firmly to the camera body. The structure is adaptable to various types of lens mountings.

6 Claims, 4 Drawing Figures

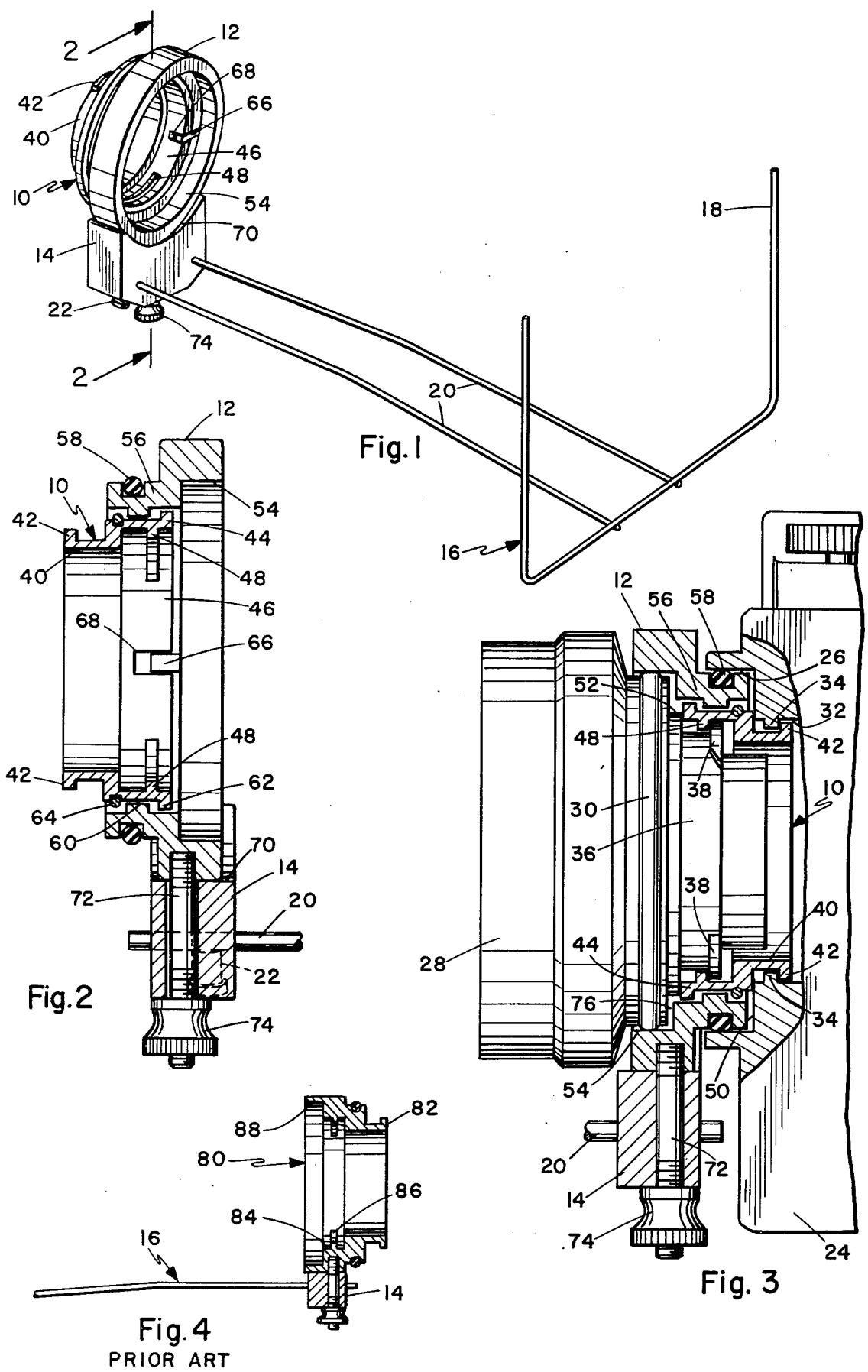

4,168,897

UNDERWATER CAMERA FOCUS ADAPTER

BACKGROUND OF THE INVENTION

In underwater photography the range of visibility is often limited and many of the subjects photographed are at very close range. Cameras with variable focus which can focus at very close range are usually enclosed in a sealed housing, which is expensive and cumbersome. Due to problems of sealing a camera for underwater use without a protective housing, the range of adjustments, such as for focus, are usually very limited.

To allow a camera to focus at very close range an adapter in the form of a lens extension has been used. This fits between the camera body and the lens and moves the lens forward to increase the lens to film plane plane distance, which shortens the focal distance. To facilitate framing and alignment of the camera with the object being photographed, a guide frame of wire or the like is mounted on the camera on an extension arm of the proper length, so that an object positioned within the guide frame is correctly in focus.

A problem with an underwater camera, with or without a lens adapter, is that the pressure differential between the interior of the camera and the surrounding water can cause distortion of the camera body and change the effective focal length of the lens. Since at very close ranges the depth of field is very limited, even a slight distortion can cause a reduction in sharpness of the image. For precise results it is therefore necessary to compensate for pressure differential, without elaborate housing or sealing structure.

SUMMARY OF THE INVENTION

The apparatus described herein enables an underwater camera to be used at very close range to photograph an object positioned in a frame attached to the camera, the focus remaining precise regardless of the depth in the water. The depth will, of course, be limited by the physical structure and effectiveness of the seals in the camera.

An adapter fits into the camera body and the existing lens unit fits into the adapter, using the conventional lens mounting structure. This moves the lens forward from its normal position and increases the lens to film plane distance, which brings the focal point of an object to be photographed very close to the camera. A wire frame mounted on the adapter and extended forward of the camera to the effective focal plane, facilitates positioning of an object to be photographed within the frame. The lens unit is firmly locked in the adapter and the adapter is firmly locked in the camera body to maintain sharp focus. Sealing between the lens and the camera body is completed by a sealing ring which floats axially on the adapter. Variations in pressure between the interior of the camera body and the surrounding water are absorbed by the sealing ring, so that distortion of the camera body does not change the lens to film plane distance and focus is maintained.

The primary object of this invention is to provide a new and improved underwater camera focus adapter.

Another object of this invention is to provide a focus adapter for an underwater camera, which prevents variation in the focus due to pressure differential.

Another object of this invention is to provide an underwater camera focus adapter which includes an alignment frame for positioning an object to be photographed.

A further object of this invention is to provide an underwater camera focus adapter which can be used with various types of lens mountings.

Other objects and advantages will be apparent in the following detailed description, taken in conjunction with the accompanying drawing, in which:

FIG. 1 is a perspective view of the complete adapter and alignment frame.

FIG. 2 is an enlarged sectional view taken on line 2—2 of FIG. 1.

FIG. 3 is a similar sectional view, reversed, showing the adapter installed between a lens and a camera body.

FIG. 4 is a sectional view similar to FIG. 2, of a prior art type of adapter.

DESCRIPTION OF THE PREFERRED EMBODIMENT

The adapter, as illustrated in FIGS. 1–3, comprises an adapter sleeve 10 on which is mounted a sealing ring 12, a support block 14 attached to sealing ring 12, and an alignment frame 16 extending from the support block.

The alignment frame 16 includes a rectangular U-shaped wire frame member 18, outlining the area which will appear in a photograph. Frame member 18 is fixed on a pair of extension arms 20, which are slidable through support block 14 and are secured by set screws 22, or the like. The extension arms are adjusted to align the frame member with the optical axis of the assembly, and are moved slidably in the support block to position the frame member at the focal plane. The general arrangement and technique are well known.

Referring now to FIG. 2, the camera body 24 has a cylindrical front socket 26 into which the lens unit 28 normally fits. For underwater use the lens unit has an O-ring 30 which seals tightly into socket 26.

Various types of lens mountings may be used, that shown being the conventional bayonet mounting, which is a quarter turn twist lock type structure. The inner lens receiving socket 32 in the camera body 24 has inwardly projecting opposed ribs 34, each extending less than 90 degrees circumferentially. Lens unit 28 has a rear barrel portion 36 which fits into inner socket 32 and has outwardly projecting opposed locking flanges 38. The locking flanges pass between ribs 34 and are engaged and locked behind the ribs by a quarter turn rotation of the lens unit. This bayonet type mounting is standard on many cameras to allow interchangeability of lenses. Other configurations have been used, such as a simple screw thread connection, which is also readily adaptable to the present structure.

Adapter sleeve 10 has a rear barrel portion 40 with outwardly projecting locking flanges 42, corresponding to the flanged barrel portion of the lens unit. The front portion 44 adapter sleeve 10 has a lens receiving socket 46, corresponding to inner socket 32, with inwardly projecting ribs 48. As illustrated in FIG. 3, the adapter sleeve is secured to camera body 24 with the locking flanges 42 locked behind ribs 34 and the rear of front portion 44 seated against the inner face 50 of socket 26. Lens unit 28 is secured in the adapter sleeve with locking flanges 38 locked behind ribs 48 and the shoulder 52 of the lens unit seated against the front face of the adapter sleeve.

Sealing ring 12 has a front socket 54, corresponding to socket 26 in the camera body, into which the lens unit 28 is sealed by O-ring 30. The rear portion 56 of sealing ring 12 fits into socket 26 and is sealed by an O-ring 58 inset in the rear portion. Rear portion 56 has an inwardly projecting circumferential retaining rib 60, which fits closely around the front portion 44 of the adapter sleeve.

The adapter sleeve 12 has an outwardly projecting front flange 62 which prevents the sealing ring from being removed forwardly. Spaced rearwardly of flange 62 is a snap ring 64 around front portion 44. The sealing ring 12 is thus trapped between flange 62 and snap ring 64, with clearance for slight axial movement. To prevent sealing ring 12 from rotating on the adapter sleeve, a fixed key 66 projects inwardly from the rear portion of socket 54 and fits into an axially extending slot 68 in front portion 44, which accommodates the axial movement of the sealing ring. Securing the sealing ring against rotation is necessary in order to hold the frame member 18 in alignment with the film frame.

Support block 14 has a concave face 70 which seats on the outside of sealing ring 12. A threaded pin 72, fixed in the sealing ring, extends through the support block 14, which is then secured by a nut 74.

In the assembly shown in FIG. 3, the lens unit 28, adapter sleeve 12 and camera body 24 are securely locked together in correct focal relation. Sealing ring 12 provides a watertight seal between the lens unit and camera body and completely encloses the adapter sleeve. Ambient air is trapped in the small annulus 76 between the sealing ring and the enclosed structure and acts as a cushion against external water pressure. The trapped air is compressed as the sealing ring is forced rearwardly by water pressure, but the camera structure is not distorted and the focus remains sharp. The movement of the sealing ring is only a few hundredths of an inch, but it has been found that the picture quality is greatly improved over that obtained with the prior art adapter shown in FIG. 4.

In this configuration, the adapter 80 incorporates the flanged barrel portion 82, lens receiving socket 84 with internal ribs 86 and the front socket 88 all in a single element. The support block 14 and frame 16 are attached directly to the largest diameter portion of the adapter. With this structure the external water pressure acts directly on the lens, the adapter and camera body, resulting in a compression which can alter the focus. At close object to camera distances the depth of field is small and focus is very critical. Even a thousandth of an inch change can deteriorate the image quality.

The slight axial displacement of the frame member 18, due to movement of the sealing ring on which it is mounted, does not affect the focus to any extent. For example, at a lens to subject distance of about 12 inches, with a lens opening of f8, the depth of field is about one inch, so slight variation can be tolerated.

The pressure compensation provided by the separate floating sealing ring is thus very desirable. The structure is simple and economical to manufacture and can be adapted to many different camera and lens combinations.

Having described my invention, I claim:

1. A focus adapter for an underwater camera having a body with a front lens receiving socket, a lens unit, said socket having lens retaining means therein and said lens unit having locking means for engagement with the retaining means, the adapter comprising:

an adapter sleeve having a rear barrel portion with locking means for engagement with the retaining means in said camera body socket;

said adapter sleeve having a front lens receiving socket with retaining means therein for engagement by the locking means on said lens unit;

and a sealing ring coaxially mounted on said adapter sleeve with limited axial freedom of movement thereon, said sealing ring having sealing means for watertight engagement with and between the camera body and the lens unit.

2. A focus adapter according to claim 1, wherein said sealing ring has a front socket corresponding to a portion of the lens receiving socket of the camera body, said sealing means including an O-ring between the lens unit and said sealing ring front socket.

3. A focus adapter according to claim 2, wherein said sealing ring has a rear portion to fit into said camera body lens receiving socket, said sealing means including an O-ring on said rear portion.

4. A focus adapter according to claim 3, wherein said adapter sleeve has axially spaced retaining means thereon, between which said sealing ring is held.

5. A focus adapter according to claim 1, wherein said sealing ring is non-rotatably retained on said adapter sleeve.

6. A focus adapter according to claim 5, and including a support attached to said sealing ring, extension arms extending forwardly from said support, and a frame member fixed on the forward ends of said arms outlining the area viewed by the camera at that distance.

* * * * *